United States Patent
Puppolo et al.

[15] 3,654,524
[45] Apr. 4, 1972

[54] ELECTROLYTIC BOOK CAPACITOR

[72] Inventors: Henry F. Puppolo, North Adams; Mark Markarian, Williamstown, both of Mass.

[73] Assignee: Sprague Electric Company, North Adams, Mass.

[22] Filed: Apr. 28, 1971

[21] Appl. No.: 138,029

Related U.S. Application Data

[63] Continuation-in-part of Ser. No. 19,192, Mar. 13, 1970.

[52] U.S. Cl. .................................317/230, 317/261
[51] Int. Cl. ..........................................H01g 9/04
[58] Field of Search.................317/230, 231, 232, 233, 260, 317/261

[56] References Cited

UNITED STATES PATENTS

| 2,470,045 | 5/1949 | Nagy.........................317/260 |
| 3,024,394 | 3/1962 | Salisbury...................317/261 |
| 3,275,916 | 9/1966 | Phillips et al. ............317/261 |
| 3,518,500 | 6/1970 | Jimerson et al...........317/230 |

*Primary Examiner*—James D. Kallam
*Attorney*—Connolly and Hutz and Vincent H. Sweeney

[57] ABSTRACT

An electrolytic book capacitor having three rolled and flattened foil units welded to each side of a stripline which consists of two conductive plates separated by an insulative layer. Each rolled foil unit has extended anode and cathode foils separated from each other by paper spacers. The anode foils are connected both electrically and physically to each other and to their respective stripline plate and the cathode foils are connected to each other and to the cathode stripline plate.

4 Claims, 8 Drawing Figures

Patented April 4, 1972

ELECTROLYTIC BOOK CAPACITOR

CROSS-REFERENCES TO RELATED APPLICATIONS

The present application is a continuation-in-part of U.S. Pat. application Ser. No. 19,192, filed Mar. 13, 1970.

BACKGROUND OF THE INVENTION

This invention relates to an electrolytic, book capacitor, and more particularly to a book capacitor construction that utilizes extended anode foils and extended cathode foils separated by spacer paper to weld the units to a stripline for low inductance termination.

Capacitors dealing with high frequency functions have presented problems to prior electronic design and usage, and have necessitated the development of high capacitance, low voltage electrolytic capacitors that filter at low frequencies and allow high speed switching at high frequencies. Electrolytic capacitors capable of operating at high frequencies demand lower effective series resistances (ESR) and lower effective series inductances (ESL), so as to decrease the power dissipated within the capacitor thereby reducing the damaging effects of overheating. Attempts to obtain these parameters have heretofore met with limited success. Capacitors utilizing a stripline construction, have achieved these goals, however new stripline constructions that reduce the cost of manufacturing these capacitors are constantly being sought.

An object of the present invention is the provision of a book capacitor in which the resistance and inductance of the capacitor are lowered so as to yield less impedance across it and allow for effective high frequency operation.

It is another object of the present invention to provide a capacitor capable of reliable high frequency operation that can be manufactured economically.

SUMMARY OF THE INVENTION

An electrolytic book capacitor is produced by stacking or rolling anode electrode foils, dielectric spacer papers, and cathode electrode foils, flattening and cutting the assembled foils in such a manner as to produce extended anodes and extended cathodes that are separated through the middle of the capacitor by spacer paper, said rolled or stacked foils having been formed to a predetermined voltage prior to this. The anode extensions or tabs of three such electrode units are welded together, as are the cathode extensions or tabs, forming a single electrode package. One of these electrode packages is then welded onto each side of a stripline. The stripline is composed of two conducting plates of substantially greater thickness than the anode and cathode electrode foils that makes up the capacitor. The stripline construction is such as to form a T shape when an L shaped anode plate is laminated to an L shaped cathode plate facing the opposite direction and separated by an insulating layer. One wing of the T is the anode plate and the other is the cathode plate. The welded anode tabs of the electrode package are welded to the anode plate of the stripline and the cathode tabs of the electrode package are welded to the cathode plate of the stripline. The combined unit is impregnated with an electrolyte and the capacitor is placed in a can.

DESCRIPTION OF THE PREFERRED EMBODIMENTS

Figure 1:
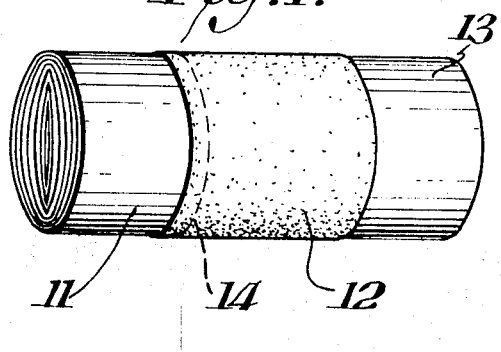
FIG. 1 is a perspective view of a rolled foil electrode unit.
Figure 2:
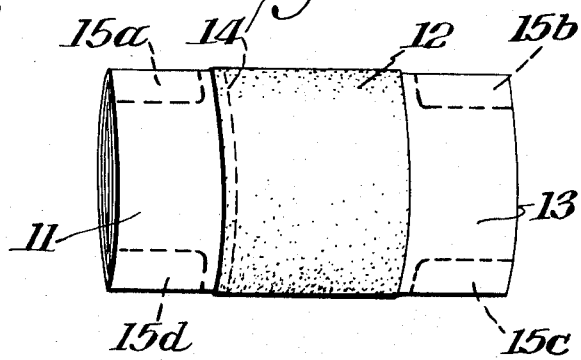
FIG. 2 is a perspective view of the electrode unit of FIG. 1 that has been flattened.
Figure 3:
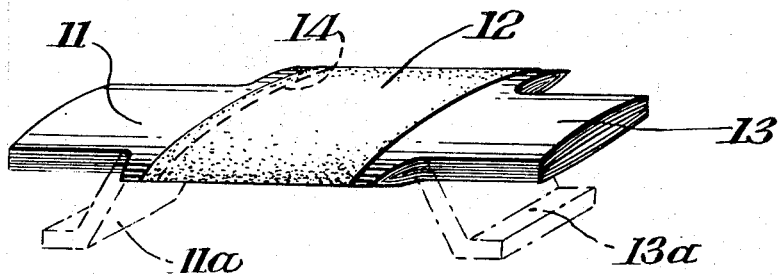
FIG. 3 is a perspective view of the electrode unit of FIG. 2 that has been cut and bent.

The rolled, electrolytic, book capacitor of this invention is produced by first winding anode foils, dielectric spacer papers and cathode foils in such an overlapping manner that anode foils and cathode foils flank the mid-section of the capacitor roll that contains alternate layers of the anode foil, dielectric spacer paper, and the cathode foil. Such an arrangement is illustrated in FIG. 1 wherein anode foils 11 are on one side extending into the middle of the roll, spacer papers 12 are in the middle, and cathode foils 13 extend from the perforated line 14 in the middle to the outer edge on the other side of the roll, the spacer papers being interposed between alternate layers of cathode foil and anode foil. This roll is then flattened in FIG. 2 and may be cut at all four corners 15a, 15b, 15c and 15d so as to produce the construction shown in FIG. 3 wherein only anode foils 11 extend out on one side and only cathode foils 13 extend out on the other side of the rolled unit. This configuration facilitates any bending of the foils that might follow.

Figure 4:
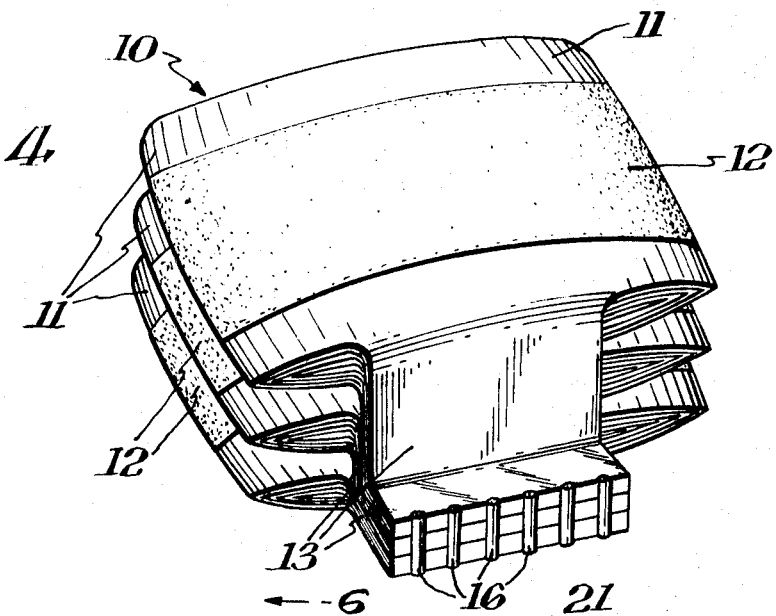
FIG. 4 is a perspective view of an electrode package of three electrode units welded together.

The anode foil tabs 11 and the cathode foil tabs 13 are then bent down to the positions shown at 11a and 13a respectively, and the outermost portions of each are bent laterally for subsequent mounting and welding purposes. Three such units are rolled, cut and bent accordingly, and mounted one atop the other in piggyback fashion having all anode foils aligned with each other and all cathode foils aligned with each other on the other side. These three units are then welded together as shown in FIG. 4 to form an electrode package 10. The cathode foils 13 are cut so that when welded at points 16, the package will have a substantially flat bottom, and the anode foils 11 are cut and welded in the same manner on the other side of the electrode package. It should be noted however, that fewer cuts on the roll may be made to produce similar although less desirable, units. The flattened rolls may be bent with no cuts made thereon, but bending problems and electrical deficiencies confronted therein make it advantageous to have some cuts on the flattened rolls.

This type of structure maintains the lower values of ESR and ESL achievable by the stacked structure of the parent application at a great savings in manufacturing costs because of the speed at which these rolled units can be produced. The anode and cathode foils of the capacitor shown herein are of high purity aluminum (99 percent or higher) which tends to eliminate problems of corrosion and insures the formation of high quality aluminum oxide films. In the alternative, anode and cathode foils could also be made of any other film forming metal such as tantalum or niobium. The anode foils 11 are formed to the desired voltages by the same techniques that are well known to the capacitor art for forming foils used in prior art rolled capacitors. The cathode foils may also be formed in order to achieve a non-polar capacitor. The anode and cathode foils are in the order of 2 to 3 mils thick. And while three rolled and flattened electrode units are welded together for each electrode package in this preferred embodiment as in FIG. 4, it should be noted that packages may contain more or less rolled electrode units depending on what capacitor characteristics are desired. The spacer paper 12 may be 0.0005 to 0.004 inch thick, Kraft or Benares type which is ordinarily used for electrolytic capacitors. The foil tabs can be welded together by Tungsten Inert Gas (TIG) welding.

Figure 5:
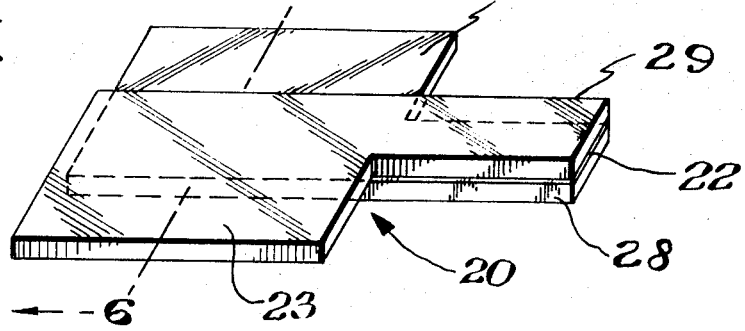
FIG. 5 shows a perspective view of a stripline assembly.
Figure 6:
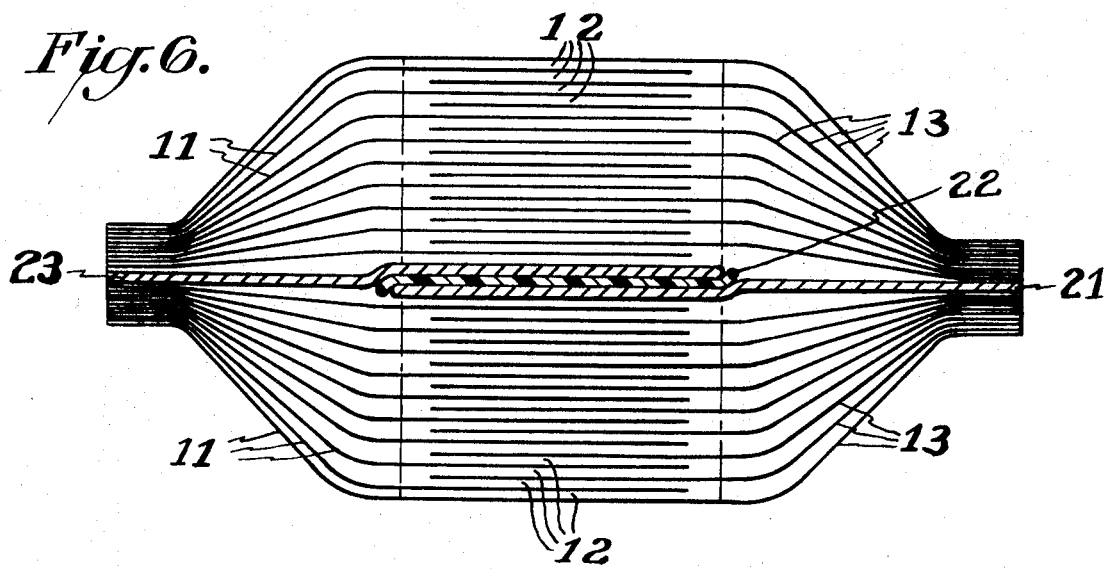
FIG. 6 is a cross sectional view of the stripline of FIG. 5 along line 6—6 having an electrode package attached to each side thereof.
Figure 7:
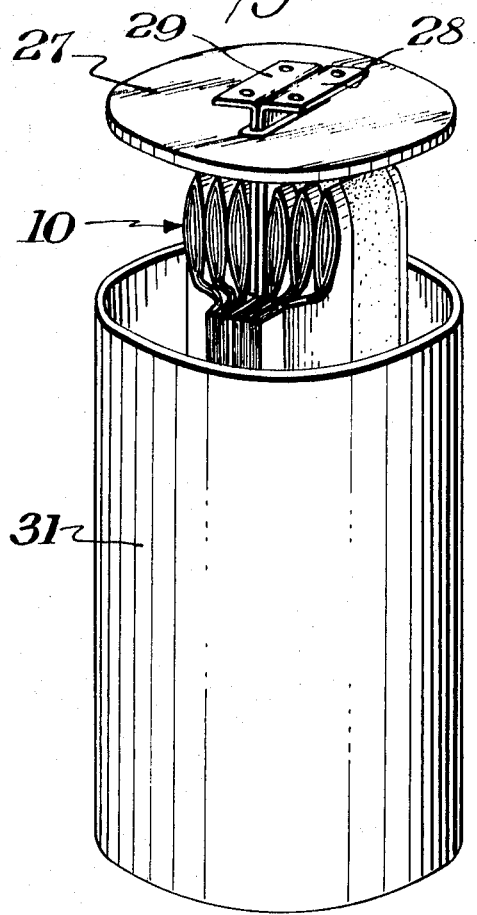
FIG. 7 is a perspective view of a capacitor container that has been opened to expose the electrode package therein.

The stripline structure 20 shown in FIG. 5 comprises an anodized, aluminum anode plate 21 and a partially overlapping anodized, aluminum cathode plate 23 separated by an insulating sheet 22. These units are laminated together. Terminals are formed at 28 and 29. Each plate has a shape similar to an L. Alternatively, the anode and cathode plates could be made of other anodizable metals such as tantalum or niobium, however, they should be of a conducting material. Both the anode plate 21 and the cathode plate 23 are of the same size and shape, and when arranged in the stripline 20, one aluminum plate is flipped over so as to form the symmetrical T structure illustrated in FIG. 5, the central portion of the anode plate being substantially identical to the central portion of the cathode plate, but the winged portion of the anode plate is the mirror image of the cathode plate, and is aligned directly opposite from the cathode plate. The thickness of the anode and cathode plates 21 and 23, and the insulating sheet 22 have all been exaggerated in the drawing in order to better illustrate the structure of the stripline. The anode and cathode plates of the preferred embodiment would normally be 64 mils thick, but could be thinner or thicker depending on the particular requirements of the capacitor. The insulating sheet 22 would be Mylar in the range of 1 to 10 mils thick although other insulating materials such as epoxy coated fabric or teflon may be used therefor. The winged portion of the anode and cathode plates 21 and 23 are provided to facilitate the welding thereto of the packages of rolled anode and cathode foils as shown in FIG. 6, along line 6—6. Although this particular geometrical configuration for the stripline seems to be advantageous, the scope of the invention is by no means limited to this particular size and shape stripline.

Two electrode packages each containing three flattened, cut, bent, and welded rolls of foil and spacer paper, are then TIG welded to the stripline assembly—one on each side thereof being welded onto the outer edge of the winged portions of the respective plates. Referring to FIG. 6, the cathode foils 13 of the electrode packages are welded to the winged portion of the cathode plate 23, and the anode foils 11 are welded to the winged portion of the anode plate 21. The two conducting plates of the stripline are separated electrically and physically by the insulating sheet 22, and the foils are separated from each other by spacer papers 12. An anode terminal 28 and cathode terminal 29 are on the extended portion of the stripline, and the capacitor 10 is impregnated with a standard electrolyte such as a glycol borate type, and packaged in a can 31 having a cover 27.

In another embodiment, the stripline could be designed so that terminals extend out of opposite ends of the capacitor can or package. These capacitors may be of the two terminal or the four terminal design.

In this embodiment each rolled unit used to make up an electrode package has a foil length of 60 inches. This is true of anode and cathode foils. Therefore, since six rolled units are used herein, and each unit measures 60 inches, then the total length of anode per capacitor is 360 inches. Six capacitors of this construction had an average ESR of 0.00153 ohms. The ESR decreases with an increased number of tabs or with an increased number of units which provides an increased number of tabs. The electrode foil and plate connecting techniques previously described for the stripline type capacitor herein drastically reduces the foil and terminal resistances, thereby contributing to the low series impedance properties of the capacitor, making the capacitor suitable for low impedance filtering and high frequency switching applications.

Figure 8:
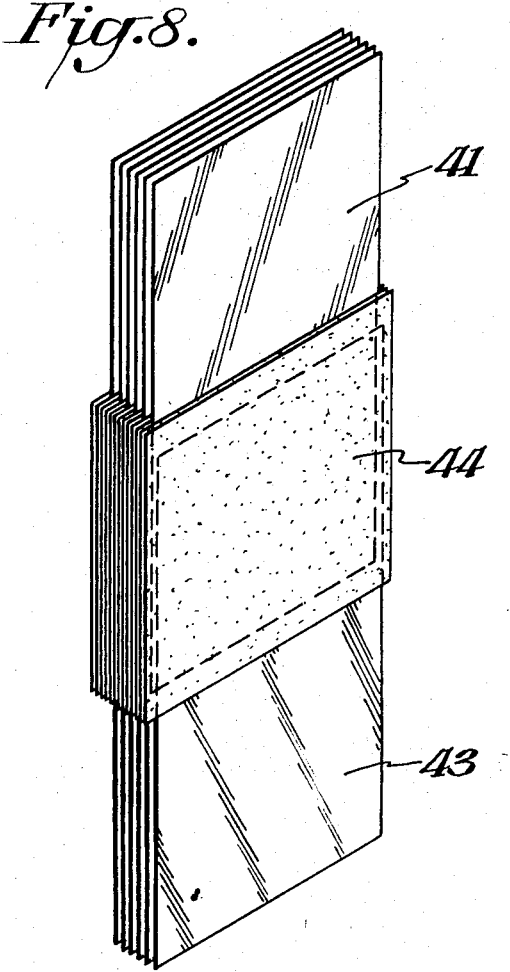
FIG. 8 is a perspective view of a stacked electrode unit.

Many different embodiments are possible of course. For example, similar although somewhat less desirable results can be obtained with the rectangular stacked design shown in FIG. 8. In this embodiment alternate, overlapping layers of anode foils 41, spacer papers 42, and cathode foils 43 are stacked such that the cathode foils 43 only extend to the perforated line 44, and the anode foils extend to a like point on the other side of the middle section of the stack. From this point on, the units can be prepared in a like manner as was described earlier for the flat, rolled units. The extending anode tabs 41 and the extending cathode tabs 43 can be bent, mounted on other units in piggyback fashion, and welded. These packages can then be welded to the stripline assembly 20 as shown in FIG. 5, wherein an anode plate 21 of anodized aluminum is separated from a cathode plate 23 of anodized aluminum by an insulating layer 22. The stripline assembly is laminated together.

The inherent inductance of the stripline type electrolytic or electrostatic capacitor is substantially lower then can be achieved with prior art wound designs with multiple tabbing. One of the most important advantages of the stripline type capacitor described herein, is the economy of manufacture discovered with the flat rolled units. The amount of labor necessary to form the units has been reduced by about 70 percent from prior art stacked foil units, while still maintaining the lower ESR's and ESL's.

Since it is obvious that many changes and modifications can be made in the above-described details without departing from the nature and spirit of the invention, it is to be understood that the invention is not limited to said details except as set forth in the appended claims.

What is claimed is:

1. A book capacitor comprising a stripline assembly having an anode plate, a terminal portion of which extends outside the book capacitor so as to provide at least one terminal for outside electrical contact to said capacitor, and a central portion of which is capable of having foils attached to either side thereof; a cathode plate of approximately the same size as said anode plate, the central portion of which is substantially identical to the central portion of said anode plate, said central portion is aligned directly opposite the central potion of said anode plate and partially overlaps the central portion of said anode plate, with a terminal portion of said cathode plate extending outside the book capacitor so as to provide at least one other terminal for outside electrical contact to said cathode plate extending outside the book capacitor so as to provide at least one other terminal for outside electrical contact to said capacitor; an insulating layer sandwiched between said overlappping anode and cathode conducting plates, to electrically isolate said plates from each other; and at least one electrode unit of overlapping, rolled and flattened anode foils, cathode foils and dielectric spacer material being arranged so said spacer material separates said foils so as to prevent electrical shorting between said foils, said anode foils being in electrical and physical connection with each other and with said anode plate, said cathode foils being in electrical and physical contact with each other and with said cathode plate.

2. The book capacitor of claim 1 wherein said anode plate has an L shape, and said central portion includes the winged portion of said L shape; said cathode plate has an L shape, and said central portion thereof includes the winged portion of said cathode plate, and is aligned directly opposite the winged portion of said anode plate; said flattened electrode unit is cut in all four corners so that a plurality of anode foils extend from one side of the unit and a plurality of cathode foils from the other side of said electrode unit; and at least one other electrode unit attached to the other side of said stripline assembly so that said anode foils are in physical and electrical connection with each other and with said anode plate, and said cathode foils are in physical and electrical connection with each other and with cathode plate.

3. The book capacitor of claim 2 having three of said electrode units mounted in piggyback fashion one atop the other attached to each side of said stripline so that said anode foils are in physical and electrical connection with each other and the anode plate, and said cathode foils in physical and electrical connection with each other and with said cathode plate.

4. The book capacitor of claim 2 wherein said anode and cathode plates are of a film forming metal; said anode and cathode foils are of a film forming metal; said anode foil is formed to a predetermined voltage and said dielectric spacer material is impregnated with an electrolyte.

* * * * *

UNITED STATES PATENT OFFICE
CERTIFICATE OF CORRECTION

Patent No. 3,654,524　　　　　　　　Dated April 4, 1972

Inventor(s) Henry F. Puppolo et al

It is certified that error appears in the above-identified patent and that said Letters Patent are hereby corrected as shown below:

Claim 1, lines 14 to 16, (Col. 4, lines 30 to 32) delete "cathode plate extending outside ... electrical contact to said"

Claim 2, line 8, (Col. 4, line 49) after "foils" insert -- extend --

Claim 2, line 14 (Col. 4, line 55) after "with" insert -- said --

Signed and sealed this 23rd day of January 1973.

(SEAL)
Attest:

EDWARD M. FLETCHER, JR.　　　　　　ROBERT GOTTSCHALK
Attesting Officer　　　　　　　　　Commissioner of Patents